(12) United States Patent
Daniilidis et al.

(10) Patent No.: US 11,138,742 B2
(45) Date of Patent: Oct. 5, 2021

(54) EVENT-BASED FEATURE TRACKING

(71) Applicant: The Trustees of the University of Pennsylvania, Philadelphia, PA (US)

(72) Inventors: Konstantinos Daniilidis, Wynnewood, PA (US); Alex Zihao Zhu, Philadelphia, PA (US); Nikolay Asenov Atanasov, San Diego, CA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 71 days.

(21) Appl. No.: 16/486,066

(22) PCT Filed: Feb. 14, 2018

(86) PCT No.: PCT/US2018/018196
§ 371 (c)(1),
(2) Date: Aug. 14, 2019

(87) PCT Pub. No.: WO2018/152214
PCT Pub. Date: Aug. 23, 2018

(65) Prior Publication Data
US 2020/0005469 A1 Jan. 2, 2020

Related U.S. Application Data

(60) Provisional application No. 62/459,039, filed on Feb. 14, 2017.

(51) Int. Cl.
*G06K 9/00* (2006.01)
*G06T 7/246* (2017.01)
(Continued)

(52) U.S. Cl.
CPC .............. *G06T 7/246* (2017.01); *G06T 7/277* (2017.01); *H04N 5/147* (2013.01); *G06T 2207/20164* (2013.01)

(58) Field of Classification Search
CPC .......... G06T 7/246; G06T 7/277; G06T 7/20; G06T 7/2033; G06T 7/0083;
(Continued)

(56) References Cited

U.S. PATENT DOCUMENTS 7,864,980 B2 * 1/2011 Evans ................ G08B 21/0423
382/103
8,121,368 B2 * 2/2012 Wiersma ................. G06T 7/251
382/128
(Continued)

OTHER PUBLICATIONS

Notification of Transmittal of the International Search Report and the Written Opinion of the International Searching Authority, or the Declaration for International Application No. PCT/US18/18196 (dated Apr. 26, 2018).
(Continued)

*Primary Examiner* — Amir Alavi
(74) *Attorney, Agent, or Firm* — Jenkins, Wilson, Taylor & Hunt, P.A.

(57) ABSTRACT

A method for implementing a soft data association modeled with probabilities is provided. The association probabilities are computed in an intertwined expectation maximization (EM) scheme with an optical flow computation that maximizes the expectation (marginalization) over all associations. In addition, longer tracks can be enabled by computing the affine deformation with respect to the initial point and using the resulting residual as a measure of persistence. The computed optical flow enables a varying temporal integration that is different for every feature and sized inversely proportional to the length of the optical flow. The results can be seen in egomotion and very fast vehicle sequences.

20 Claims, 7 Drawing Sheets

(51) Int. Cl.
  *G06T 7/277* (2017.01)
  *H04N 5/14* (2006.01)
(58) Field of Classification Search
  CPC .......... G06T 2207/20164; G06T 2207/10016; G06K 9/3233; G06K 9/00777; G06K 9/4609; G06K 9/48; H04N 5/147; G11B 27/28
  See application file for complete search history.

(56) References Cited

U.S. PATENT DOCUMENTS

| | | | |
|---|---|---|---|
| 8,180,112 B2* | 5/2012 | Kurtz | G06K 9/00926 382/108 |
| 8,867,891 B2* | 10/2014 | Jiang | H04N 21/233 386/241 |
| 9,020,190 B2* | 4/2015 | Fan | G06K 9/6277 382/103 |
| 9,058,744 B2* | 6/2015 | Huang | G06K 9/00785 |
| 9,177,209 B2* | 11/2015 | Chang | H04H 60/59 |
| 9,183,466 B2* | 11/2015 | Siskind | G06F 16/7837 |
| 9,361,524 B2* | 6/2016 | Ghanem | G06T 7/215 |
| 9,773,192 B2* | 9/2017 | Li | G06T 7/13 |
| 10,109,057 B2* | 10/2018 | Benosman | G06T 7/73 |
| 2013/0335595 A1 | 12/2013 | Lee et al. | |
| 2014/0105506 A1 | 4/2014 | Drost et al. | |
| 2016/0094787 A1 | 3/2016 | Govil et al. | |
| 2016/0094796 A1 | 3/2016 | Govil | |
| 2016/0139795 A1 | 5/2016 | Park et al. | |
| 2017/0031032 A1 | 2/2017 | Garin et al. | |
| 2020/0005469 A1* | 1/2020 | Daniilidis | H04N 5/232 |

OTHER PUBLICATIONS

Zhu et al., "Event-based Feature Tracking with Probabilistic Data Association," 2017 IEEE International Conference, https://ieeexplore.ieee.org/document/7989517/, pp. 1-6 (May 29-Jun. 3, 2017).
Kueng et al., "Low-Latency Visual Odometry using Event-based Feature Tracks," 2016 IEEE/RSJ International Conference, https://ieeexplore.ieee.org/document/7758089/, pp. 1-8 (Oct. 2016).
Tedaldi et al., "Feature Detection and Tracking with the Dynamic and Active-Pixel Vision Sensor (DAVIS)," Second International Conference on Event-based Control, Communication, and Signal Processing (EBCCSP), pp. 1-7 (Jun. 2016).
Barranco et al., "A Dataset for Visual Navigation with Neuromorphic Methods," Frontiers in Neuroscience, vol. 10, No. 49, pp. 1-9 (Feb. 2016).
Lagorce et al., "Asynchronous Event-Based Multikernel Algorithm for High-Speed Visual Features Tracking," IEEE Transactions on Neural Networks and Learning Systems, vol. 26, No. 8, pp. 1710-1720 (Aug. 2015).
Mueggler et al., "Lifetime Estimation of Events from Dynamic Vision Sensors," IEEE International Conference on Robotics and Automation (ICRA), pp. 4874-4881 (May 2015).
Ni et al., "Visual Tracking Using Neuromorphic Asynchronous Event-Based Cameras," Neural Computation, vol. 27, No. 4, pp. 925-953 (Apr. 2015).
Tschechne et al., "On event-based motion detection and integration," Proceedings of the 8th International Conference on Bioinspired Information and Communications Technologies, pp. 298-305 (Dec. 2014).
Brandli et al., "A 240×180 130 dB 3 µs Latency Global Shutter Spatiotemporal Vision Sensor," IEEE Journal of Solid-State Circuits, vol. 49, No. 10, pp. 2333-2341 (Oct. 2014).
Kim et al., "Simultaneous Mosaicing and Tracking with an Event Camera," British Machine Vision Conference, pp. 1-12 (2014).
Lichtsteiner et al., "A 128×128 120 dB 15 µs Latency Asynchronous Temporal Contrast Vision Sensor," IEEE Journal of Solid-State Circuits, vol. 43, No. 2, pp. 566-576 (Feb. 2008).
Litzenberger et al., "Embedded Vision System for Real-Time Object Tracking using an Asynchronous Transient Vision Sensor," IEEE 12th Digital Signal Processing Workshop & 4th IEEE Signal Processing Education Workshop, pp. 173-178 (Sep. 2006).
Granger et al., "Multi-scale EM-ICP: A Fast and Robust Approach for Surface Registration," European Conference on Computer Vision (ECCV) pp. 418-432 (Apr. 2002).
Comaniciu et al., "Real-Time Tracking of Non-Rigid Objects using Mean Shift," Proceedings IEEE Conference on Computer Vision and Pattern Recognition (CVPR), vol. 2, pp. 142-149 (Jun. 2000).
Shi et al., "Good Features to Track," IEEE Conference on Computer Vision and Pattern Recognition (CVPR), pp. 593-600 (Jun. 1994).
Harris et al., "A Combined Corner and Edge Detector," Citeseer, Alvey Vision Conference, pp. 147-152 (1988).
Horn et al., "Determining Optical Flow," Artificial Intelligence, vol. 17, pp. 185-203 (Aug. 1981).
Lucas et al., "An Iterative Image Registration Technique with an Application to Stereo Vision," International Joint Conference on Artificial Intelligence (IJCAI), vol. 81, pp. 674-679 (1981).

* cited by examiner

EVENT-BASED FEATURE TRACKING

PRIORITY CLAIM

This application claims the benefit of U.S. Provisional Patent Application Ser. No. 62/459,039 filed Feb. 14, 2017, the disclosure of which is incorporated herein by reference in its entirety.

TECHNICAL FIELD

This specification relates generally to computer systems for event-based feature tracking using asynchronous event-based sensors.

BACKGROUND

Asynchronous event-based sensors present new challenges in basic robot vision problems like feature tracking. The few existing approaches rely on grouping events into models and computing optical flow after assigning future events to those models. Such a hard commitment in data association attenuates the optical flow quality and causes shorter flow tracks.

SUMMARY

This specification describes a soft data association modeled with probabilities. The association probabilities are computed in an intertwined expectation maximization (EM) scheme with the optical flow computation that maximizes the expectation (marginalization) over all associations. In addition, to enable longer tracks we compute the affine deformation with respect to the initial point and use the resulting residual as a measure of persistence. The computed optical flow enables a varying temporal integration different for every feature and sized inversely proportional to the length of the flow. The results can be seen in egomotion and very fast vehicle sequences and we show the superiority over standard frame-based cameras.

The subject matter described herein may be implemented in hardware, software, firmware, or any combination thereof. As such, the terms "function" or "node" as used herein refer to hardware, which may also include software and/or firmware components, for implementing the feature(s) being described. In some exemplary implementations, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

I. Introduction

Robot vision continues to primarily rely on the main paradigm of frame-based cameras that acquire whole frames with fixed time exposure and frame rate. An alternative camera paradigm has emerged recently, that captures at almost unlimited frame rate changes in intensity and records events at specific time-points and image locations. Such sensors like the DVS [1] or DAVIS [2] cameras enable tasks entailing very fast motions and high dynamic range. However, to facilitate these tasks we have to redefine basic vision problems like optical flow or feature tracking because of the lack of representations that could make use of fundamental assumptions like the brightness change constraint [3].

The fundamental challenge underlying event-based tracking is the lack of any data association between event and established features. Grouping the events and searching for the most similar event group is impossible because events are arriving asynchronously and grouping would require a time window specification. Without knowing the optical flow we are unable to assign a new event to the closest feature unless the flow is under one pixel. In this document, we introduce a novel approach for feature definition by addressing the data association for each event to a feature as a hidden soft random variable. We regard the associations as probabilities because we do not need to make a hard commitment of an event to a feature. We apply an expectation-maximization (EM) scheme, where given optical flow we compute probabilities (weights) for data association and then we take the expectation over these probabilities in order to compute the optical flow. Inspired by the Good Features to Track approach [4] we model the alignment between events and features as an affine transformation and end the duration of the feature based on the quality of the alignment as well as the convergence of the EM iteration. Grouping of the events into a feature is not by a fixed spatiotemporal window but rather by a lifetime defined by a fixed length of the optical flow computed in the previous steps.

Figure 1:
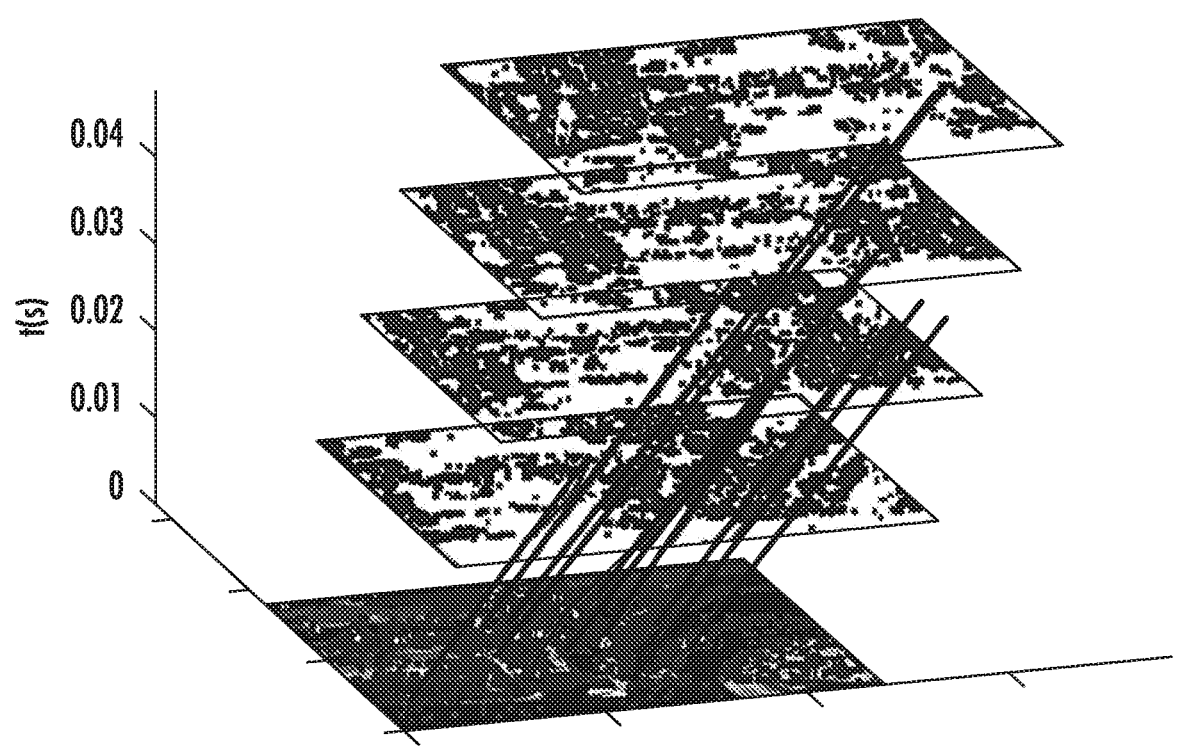
FIG. 1 illustrates selected features tracked on a semi truck.

FIG. 1 illustrates selected features tracked on a semi truck driving at 60 miles/hr, 3 meters from a camera. Intermediate images are generated by integrating events for a period equal to three times their lifetimes.

We show in very fast motion scenarios that we can track robustly features over long trajectories. In this document, we make the following novel contributions to the state of the art of event-based tracking:

Events are grouped into features based on lifespan defined by the length of the optical flow.

Assignment of events to existing features is soft and computed as probability based on a predicted flow.

Flow is computed as a maximization of the expectation over all data associations.

Deformation of the feature is modeled as affine and the residual of the affine fit serves as a termination criterion.

II. Related Work

Litzenberger et al. [5], inspired by mean-shift tracking [6], create clusters of events by assigning events to the closest centroid. Each cluster is weighted by the mean frequency of the events and inactive clusters are eliminated. Kim et al. [7] estimate a 3D-rotation for the purpose of mosaicking by updating a particle filter with the likelihood of each new event given the current pose estimate. [8] propose an approach where an event is assigned to the spatially closest feature model and its Euclidean transformation and scaling with respect to the model is computed. Initialization is achieved by fitting spatiotemporal planes to the event space. Lagorce et al. [9] define features using the Hough transform and then assign events using the ICP principle. Tschechne et al. [10] introduced the notion of a motion streak using biological vision principles where event tracks are detected by tuning spatiotemporal orientation over a longer temporal support. [11] and [12] were the first to combine a frame based camera and event-based sensor on the same pixel array for tracking. Using a corner and an edge detector this approach initializes a feature patch which is enhanced by new events that are registered using a 2D Euclidean transformation. The commitment of an event to a feature is hard and hence the registration is prone to false event associations.

A common characteristic of the above approaches is the hard commitment, usually via ICP, to the assignment of an event to a model/feature with a subsequent estimate of a transformation given that commitment. Our approach integrates both data association and transformation estimation into a sound probabilistic scheme that makes it less prone to wrong correspondences. It does not make use of grayscale feature initializations. It is tested in very fast sequences where we show superiority over standard frame-based techniques. Barranco et al. [13] have created an evaluation dataset which offers ground truth optical flow but not longer feature trajectories. It provides self-motion estimates and we plan to use the dataset on the application of our feature tracking in visual odometry.

III. Problem Formulation

Let t $F \in \mathbb{R}^3$ and $f(t) \in \mathbb{R}^2$ be the projection of F onto the image plane at time t:

$$\begin{pmatrix} f(t) \\ 1 \end{pmatrix} \sim K[R(t) \; T(t)] \begin{pmatrix} F \\ 1 \end{pmatrix} \quad (1)$$

where K is the camera calibration matrix and [R(t) T(t)] is the camera pose. In the remainder, we refer to the projections f(t) as features and consider a set of features $\mathcal{F}(t)$. Given a feature $f \in \mathcal{F}(0)$, define a spatial window $B(s) := \{c \in \mathbb{R}^2 | \|x-f\| \leq s\}$. Let $\{P_j \in \mathbb{R}^3\}_{j=1}^m$ be a set of 3-D points, whose projections $\{p_j(0)\}_{j=1}^m$ onto the image plane at time 0 are contained within the window B(s). Let $\mathcal{P}^f(t)$ denote the set of point projections associated with feature $f \in \mathcal{F}(0)$ at time t. At discrete times $t_1 \ldots t_n$, the sensor generates a set of events $\{e_i := (x_i, t_i)\}_{i=1}^n$, where $$x_i := p_{\pi(i)}(t_i) + \eta(t_i), \eta(t_i) \sim \mathcal{N}(0, \Sigma), \forall i$$

and $\pi : \{1, \ldots, n\} \to \{1, \ldots, m\}$ is an unknown many-to-one function representing the data association between the events $\{e_i\}$ and projections $\{p_j\}$.

Problem (Event-based Feature Tracking). Given a set of events $\varepsilon$ generated by the point projections $\bigcup_{t=0}^T \bigcup_{f \in \mathcal{F}(0)} \mathcal{P}^f(t)$, estimate the feature projections $\mathcal{F}(t)$ in the image plane over time.

IV. Method

In Section IV-A, we introduce an optical flow based constraint that groups events projected from the same point within a spatiotemporal window. Section IV-B then shows that we can optimize this constraint over the optical flow using the Expectation Maximization algorithm. The resulting flow can then be used to reconstruct the set of point projections within the spatial window, which we then use in Section IV-C to refine the feature position using the expectation maximization-iterative closest point (EM-ICP) algorithm [14]. Our tracking method then iterates between Section IV-B and Section IV-C to track a given set of features over time in the event stream. Section IV-D outlines our technique to select the size of the temporal windows in an asynchronous fashion, Section IVE details our method for initializing the feature positions, and Section IV-F summarizes our method for estimating the image features within each window.

A. Spatiotemporal Optical Flow Constraint

The motion of a feature $f(t) \in \mathcal{F}(t)$ in the image plane can be described using its optical flow $\dot{f}(t)$ as follows:

$$f(t) = f(0) + \int_0^t \dot{f}(s) ds = f(0) + t v(t), \quad (2)$$

Where v(t) is the average flow of over time. If t is sufficiently small, we can assume that the average flow v is constant and equal to the average flows of all point projections P(0) associated with f(0). We can define a spatiotemporal window around f(0) as the collection of events up to time t that propagate backwards onto B(s):

$$W(s,t) := \{e_i | t_i < t, x_i - t_i v \in B(s)\} \quad (3)$$

Thus, provided that t is small, events corresponding to the same point in P(0) should propagate backwards onto the same image location. In other words, the following equality should hold for any pair $i, k \in [n]$ of events:

$$\|(x_i - t_i v) - (x_k - t_k v)\|^2 \mathbf{1}_{\{\pi(i) = \pi(k) = j\}} = 0, \forall i, k \in [n] \quad (4)$$

However, since the data association $\pi$ between events and 3D points is unknown, we can hope to satisfy the above requirement only in expectation:

$$\mathbb{E}_{\pi(i), \pi(k)} \|(x_i - t_i v) - (x_k - t_k v)\|^2 \quad (5)$$

$$\mathbf{1}_{\{\pi(i) = \pi(k) = j\}} = \left[\sum_{j=1}^m r_{ij} r_{kj}\right] \|(x_i - t_i v) - (x_k - t_k v)\|^2 = 0$$

where $r_{ij} := \mathcal{P}(\pi(i) = j)$ and we assume that $\pi(i)$ is independent of $\pi(k)$.

Given an affine transformation (A,b) and the flow v of feature f(0), we model the noise in the event generation process by defining the probability that event $e_i$ was generated from point $p_j$ as proportional to the pdf $\phi(A(x_i - t_i v) + b; p_j, \Sigma)$ of a Normal distribution with mean $p_j$ and covariance $\Sigma$, i.e., $$r_{ij}(\{p_j\}) := \frac{\phi(A(x_i - t_i v) + b_i p_j, \Sigma)}{\sum_{l=1}^m \phi(A(x_i - t_i v) + b_i p_l, \Sigma)} \quad (6)$$

Where the argument $\{p_j\}$ is the set of points over which the means are defined. From here on, we will assume that $r_{ij}$ with no argument implies that the set is the point projections $\{p_j\}$. Note also that $\Sigma$ is a parameter.

One can see that, by minimizing the distance between propagated events that correspond to the same point, we are effectively enforcing a sparsity constraint over the spatial domain into which the events propagate.

We propose an iterative approach to estimate the data association probabilities $r_{ij}$ between the events $\{e_i^f\}$ and points $\{p_j^f\}$, the affine transformation A, b, and the optical flow v of feature f.

---

Algorithm 1

---

Initialization
    Initialize τ as t'/k and integrate events for a short period of time over the image.
    Detect corner points using Harris corners on the integrated image, and initialize features $f_j$ at each corner.
Tracking
    Collect events for kτ seconds
    for each feature do
        A ← $I_2$, b ← 0, v ← 0, cost ← ∞, $\{p_j\}$ ← { }
        while cost > ε do
            Find events within W (s, kτ) (3)
            Update $r_{ij}(\{p_j\})$ (6)
            Update A, b (8)
            Calculate cost (7)
        end while
        Propagate events within the window to $t_0$ using v
        if $\{p_j\}$ = { } then
            $\{p_j\}$ ← propagated events
            continue
        end if
        cost ← ∞
        while cost > ε do
            Find events within W (s, t) (3)
            Update $r_{ij}(\{p_j\})$ (6)
            Estimate A, b and $\dot{x}$ using (11)
            Calculate cost (10)
        end while
        $\{p_j\}$ ← $\{p_j\}$ − b + v × kτ
    end for
    τ ← 1/median($\{\|v\|\}$)

---

B. EM Optical Flow Estimation

In this section, we propose an Expectation Maximization algorithm for solving (5) over a spatiotemporal window W(s, t) with a set of events $\{e_i, i \in [1,n]\}$. Within this window, our optical flow constraint becomes $$\min_v \sum_{i=1}^{n} \sum_{k=1}^{n} \left[ \sum_{j=1}^{m} r_{ij} r_{kj} \right] \|(x_i - t_i v) - (x_k - t_k v)\|^2 \quad (7)$$

In the E step, we update the $r_{ij}$ and $r_{kj}$, given v using (6). Initially, the set of point positions $\{p_j\}$ is unknown, and so we first approximate the $\{p_j\}$ by the set of propagated events $\{x_i - t_i v\}$. In general, $x_i - t_i v \to p_{\pi(i)}$ as $v \to v'$, where $v'$ is the true optical flow. In addition, as A and b are unknown, we initialize them as A=I and b=0. The full update, then, is $r_{ij}(\{e_i\})$.

The M step now involves solving for v given the $r_{ij}$. As we assumed that the average optical flow v is constant, (7) is a linear least squares problem in v, which corresponds to the general overdetermined system:

$$YD = X \quad (8)$$

where $Y := v^T$ $$D := \left[ \sqrt{w_{12}}(t_1 - t_2), \ldots, \sqrt{w_{1n}}(t_1 - t_n), \ldots, \sqrt{w_{n(n-1)}}(t_n - t_{n-1}) \right]$$

$$X := \left[ \sqrt{w_{12}}(x_1 - x_2), \ldots, \sqrt{w_{1n}}(x_1 - x_n), \ldots, \sqrt{w_{n(n-1)}}(x_n - x_{n-1}) \right]$$

$$w_{ik} := \sum_{j=1}^{n} r_{ij} r_{kj}$$

To get the normal equations, we multiply both sides on the right by $D^T$:

$$Y = (XD^T)(DD^T)^{-1} = \frac{\sum_{i=1}^{n} \sum_{k=1}^{n} w_{ik}(x_i - x_k)(t_i - t_k)}{\sum_{i=1}^{n} \sum_{k=1}^{n} w_{ik}(t_i - t_k)^2} \quad (9)$$

We iterate equations (6) and (8) until convergence of the error (4). As in [14], we reject outlier matches by thresholding the likelihood $w_{ik}$ when computing (8) by setting all the $w_{ik}$ higher than some threshold ε to 0.

C. Feature Alignment

The flow estimate from Section IV-B can then be used to propagate the events within the window to a common time $t_0$. Give a correct flow, this set of events is then the approximation to the projection of the points $P_j$ at time $t_0$, up to an affine transformation. As a result, given the set of point projections at time $t_0$, $\{p_j := p_j(t_0) \in \mathbb{R}^2\}_{j=1}^{m}$, we can align the events with their corresponding points using a similar EM formulation as in Section IV-B. The cost function for this alignment is that of the EM-ICP algorithm [14]:

$$\min_{A,b,r} \sum_{i=1}^{n} \sum_{j=1}^{m} r_{ij} \|A(x_i - t_i v) + b - p_j\|^2 \quad (10)$$

We can minimize this cost function using exactly the steps from Section IV-B. In the E step, we can use (6) to update $r_{ij}$.

The M step is also similar:

$$M: Y = (XD^T)(DD^T)^{-1} \quad (11)$$

Where:

$$Y := [A \quad b]$$

$$X := \left[ \sqrt{r_{11}} p_1, \ldots, \sqrt{r_{1m}} p_m, \ldots, \sqrt{r_{nm}} p_m \right]$$

$$D := \left[ \sqrt{r_{11}} \begin{pmatrix} x_1 \\ 1 \end{pmatrix}, \ldots, \sqrt{r_{1m}} \begin{pmatrix} x_1 \\ 1 \end{pmatrix}, \ldots, \sqrt{r_{n,m}} \begin{pmatrix} x_n \\ 1 \end{pmatrix} \right]$$

As in Section IV-B, we iterate (6) and (11) until the error function (10) converges. We then use the new estimate for b to refine the prior estimate for the image feature positions, and propagate them to the next window as:

$$f_j(t_n) = f_j(t_0) - b + v(t_n - t_0) \quad (12)$$

If the EM fails to converge, or if the value of (10) is too high after convergence, we consider the tracker lost and abandon the feature.

D. Temporal Window Selection

Many event based techniques have worked on temporal windows of fixed size. However, these techniques have many similar drawbacks to traditional cameras, as the amount of information within the windows is highly variable depending on the optical flow within the image. Due to the quantization of the spatial domain, no information about the optical flow can be gained from the event stream until the projected points have moved at least one pixel within the image. On the other hand, too large of a window may violate the constant optical flow assumption made in Section IV-B. To ensure that the temporal windows are of an appropriate size, we dynamically adjust them using the concept of event 'lifetimes' [15]. Given the optical flow of a feature within a prior spatiotemporal window, we can estimate its lifetime $r$ as the expected time for the feature to move one pixel in the spatial domain:

$$\tau = \frac{1}{\|v\|} \quad (13)$$

For robustness against erroneous flow estimates, we estimate the lifetimes of several windows, and set the next temporal window size as k times the median lifetime. In our experiments, we observed that k=3 was a reasonable value to avoid large optical flow deviations while still capturing a sufficient number of events. This technique can be extended to have separate temporal window sizes for each tracked feature for fully asynchronous tracking between features. However, we found that, in our testing, the variation in optical flow of our features was not large enough to require this.

E. Feature Selection

As this method relies on the assumption that the projected points are sparse, it will fail on spatial windows with dense points throughout. In addition, the matching scheme in Section IV-C suffers from the same aperture problem as traditional feature matching techniques. To avoid selecting such windows for our tracker, we propagate all events within a temporal window onto the image plane with zero flow to generate an image. We then use the Harris corner detector [16] to select spatial windows with large variations, i.e., variations that exceed a configurable threshold number of variations, in image intensity (in this case, event density) in multiple directions.

F. Point Set Generation

On the first iteration of this algorithm, we run the flow estimation in Section IV-B, and propagate events within the first spatiotemporal window to the time of the last event in the window, T. In the next step, we use these propagated events as the projected point positions, and match the events in the next window propagated to time T. We then concatenate the next set of propagated, aligned events to our point set, up to some fixed maximum number of points N, and continue to propagate this set to the beginning of the next temporal window at each iteration. To reduce the computation time for matching against this potentially large feature set, we perform the sphere decimation algorithm in [14] to reduce the cardinality of this set once N points are collected.

Figure 2:
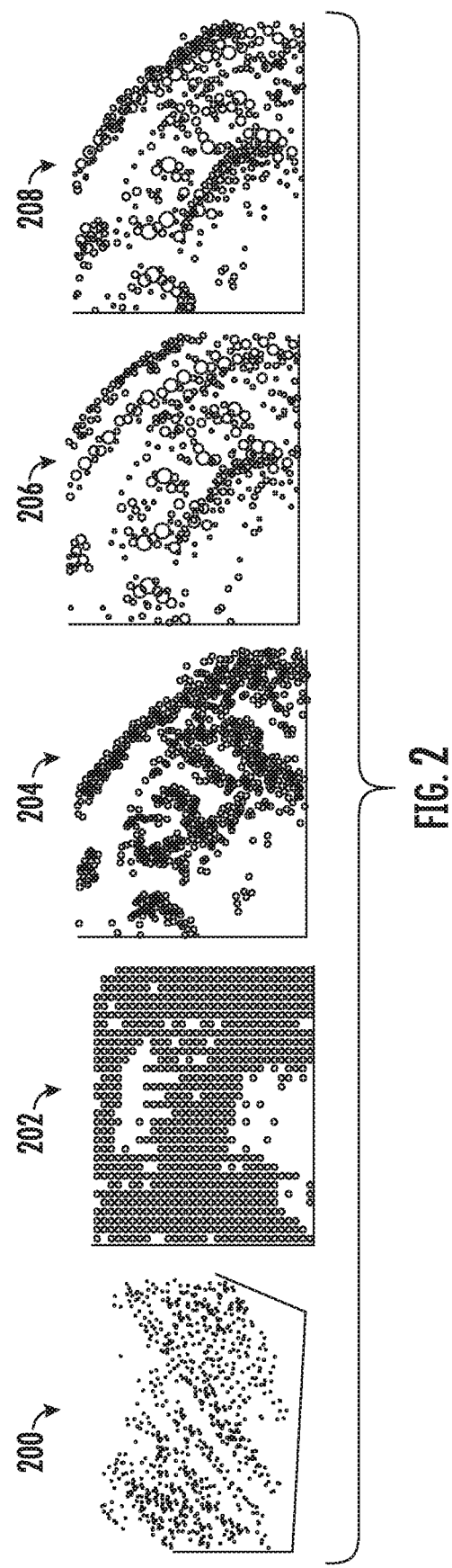
FIG. 2 is a graphical outline of the algorithm.

FIG. 2 is a graphical outline of the algorithm. A first image 200 shows an event stream within a spatiotemporal window. Diagonal lines are formed by the linear optical flow. A second image 202 shows events integrated directly onto the image with no flow correction. A third image 204 shows propagated events with estimated flow. Motion blur has been removed. A fourth image 206 shows a later set of propagated events before affine warping. The size of the lighter circles are the weights of each point after decimation. A fifth image 208 shows a later set of propagated events after affine warping.

V. Experiments

We present the results of our approach using a DAVIS-240C sensor [2] in two situations. First, we compare the tracking accuracy of our tracking algorithm on a structured, textured area at normal speeds against traditional image based tracking on the frame-based intensity values from the DAVIS. We then demonstrate qualitative results of our algorithm on tracking a vehicle on a highway travelling at roughly 60 miles/hr, which we qualitatively compare to the tracking results on the 240 frames per second (FPS) output of an iPhone 6.

In each experiment, we used 31×31 pixel patches, with $\Sigma_j$ set to $2 \times I_2$. At the beginning of each sequence, a manually picked integration time is selected to start the algorithm to guarantee that the first temporal window contained significant apparent motion in the spatial domain. However, this time is very robust, and we found that any integration time where points moved at least 2 pixels was sufficient. In both experiments, 20 features were generated, with new features initialized if fewer than 12 remained.

A. Comparison with Frame-Based Tracking

To quantitatively analyze the performance of our algorithm, we recorded a sequence where the DAVIS camera was moved in front of a textured surface (FIG. 3), and compare our results to the KLT tracker [17]. Due to the relatively low frame rate of 25 Hz for the frame based images on the DAVIS, this motion was restricted to relatively low speeds. Features were initialized from the integrated event image, and tracked in both the event stream as well as the frame based images until the majority of features were lost in both trackers. During the one second tracking period, the features moved on average 100 pixels.

Figure 3:
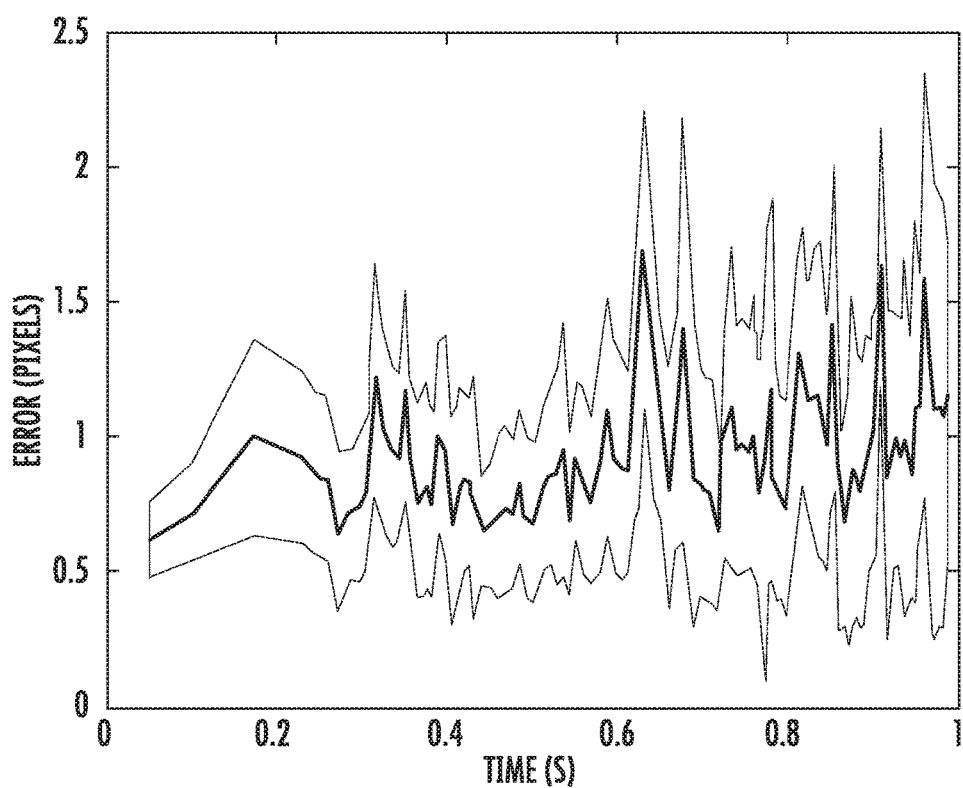
FIG. 3 shows the norm of feature position error between the method and Kanade-Lucas-Tomasi (KLT)
Figure 4:
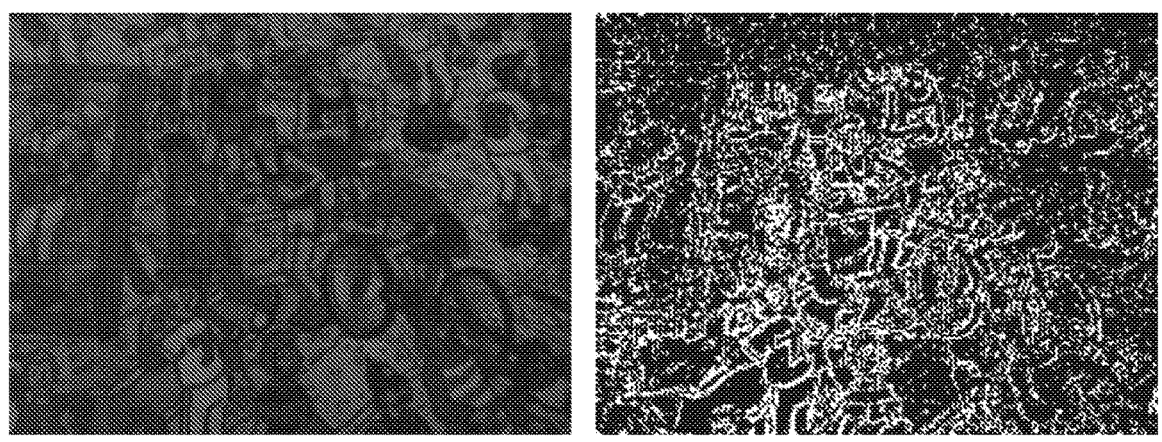
FIG. 4 shows a comparison between frame-based and integrated-event images.
Figure 5:
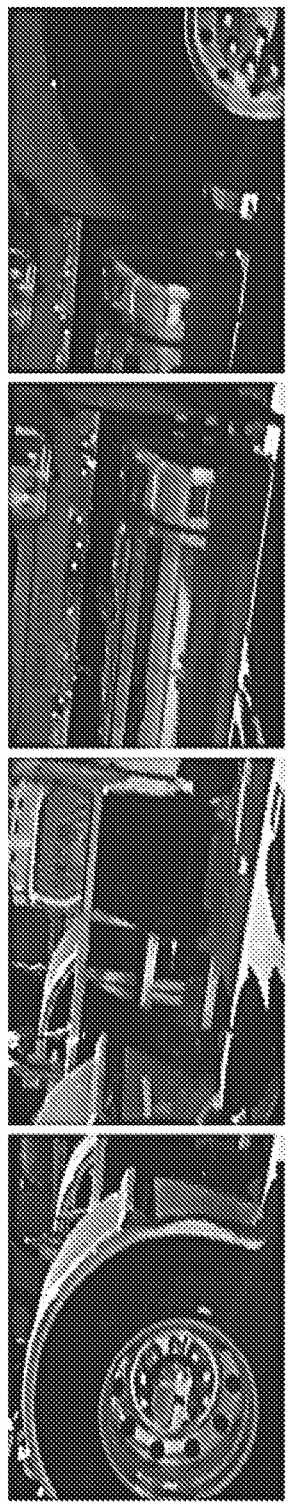
FIG. 5 shows images of a truck driving on a highway.

FIG. 3 shows the norm of feature position error between the method and KLT. FIG. 4 shows a comparison between frame-based and integrated-event images. FIG. 5 shows images of a truck driving on a highway recorded from the 240 FPS video.

We show the mean tracking error for features that had not been discarded in FIG. 3, where the black line is the mean tracking error over all the features, and the lighter region is one standard deviation around the mean error. As the event based measurements arrive much faster than the frame based ones, we interpolate the event based feature position estimates to the nearest frame based position estimate in time using the event based optical flow estimate. The overall mean error from this technique is 0.9492 pixels, which is comparable to the state of the art in this topic.

B. Tracking on Scenes with High Apparent Motion

To test the algorithm on scenes with very high apparent motion, the camera was placed on the side of a highway with a speed limit of 60 miles per hour. Cars passed the camera at a distance between 3-4 meters, and passed the field of view in under 0.5 s. We present here the results of tracking on a semi truck driving by at the posted speed limit. In this sequence, the average flow magnitude was 4000 pixels/s, and the (roughly) 15 m long truck passed the camera's field of view in 800 ms. The frame based images from the DAVIS sensor for these vehicles were almost completely blurred out. For comparison, we also recorded the scene with an iPhone 6 at 240 FPS (FIG. 5), on which we also ran a KLT tracker. The 240 FPS video is sufficient to capture the motion in this sequence, but is beginning to show motion blur on the order of one or two pixels. The two cameras' extrinsic parameters were estimated using stereo calibration. Unfortunately, due to the relatively close distance of the vehicles to the camera, we were unable to accurately warp the images onto one another for a quantitative comparison, and so we will instead give qualitative comparisons for our flow estimation based on a warp of the iPhone images assuming that points all have a depth of 3 meters.

We visualize a subset of the feature tracks in FIG. 1. It is interesting to note that, while the first integrated event image (superimposed over the iPhone image) has a significant amount motion blur, the subsequent images have structures only a few pixels thick, due to the lifetime estimation from the optical flow.

Figure 6:
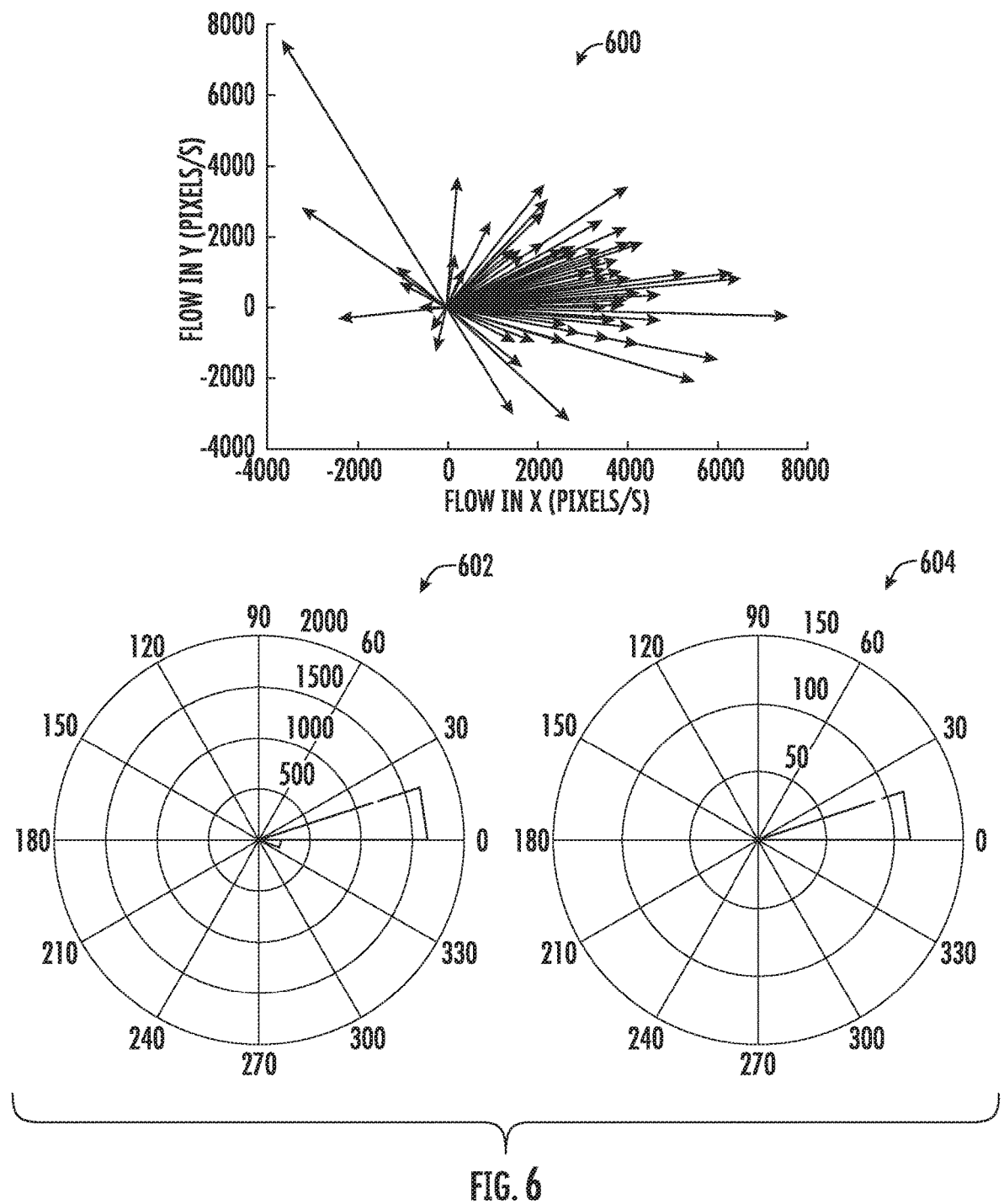
FIG. 6 includes a chart illustrating optical flow estimates and KLT tracking.

In FIG. 6, we analyze the distribution of the direction of the optical flow vectors estimated by our method and by the KLT tracker. FIG. 6 includes a chart 600 illustrating optical flow estimates (light areas) and KLT tracking (dark areas). FIG. 6 also includes a polar histogram 602 (20 bins) of optical flow directions estimated by our method. FIG. 6 also includes a polar histogram 604 (20 bins) of optical flow directions estimated by KLT.

We can see that the majority of flow vectors lie between 0 and 20 degrees. This can also be seen in the chart 600 in FIG. 6, which shows individual flow vectors, with optical flow calculated within tracks shorter than 20 ms removed. From these plots, we can see that both the direction and magnitude of the KLT flow vectors are very similar, although they should not perfectly correspond.

VI. Conclusion

This specification describes a novel approach for feature tracking in asynchronous event-based sensors that relies on probabilistic data association. Estimating optical flow becomes, thus, not sensitive to erroneous associations of new events and is computed from the expectation over all associations. To increase persistence of our tracks we compute the affine transformation for each feature with respect to the starting time. Existing approaches use a hard correspondence commitment and usually compute a similitude transformation. The spatiotemporal support of our features is adaptive and defined by the size of the flow rather than a fixed time or a number of events. We show that it outperforms classic KLT trackers when they are applied to 240 FPS cameras capturing very fast motions of the order of one field of view per half a second. We plan a real-time implementation so that we can apply it in real robot scenarios of visual odometry and moving object tracking.

Figure 7:
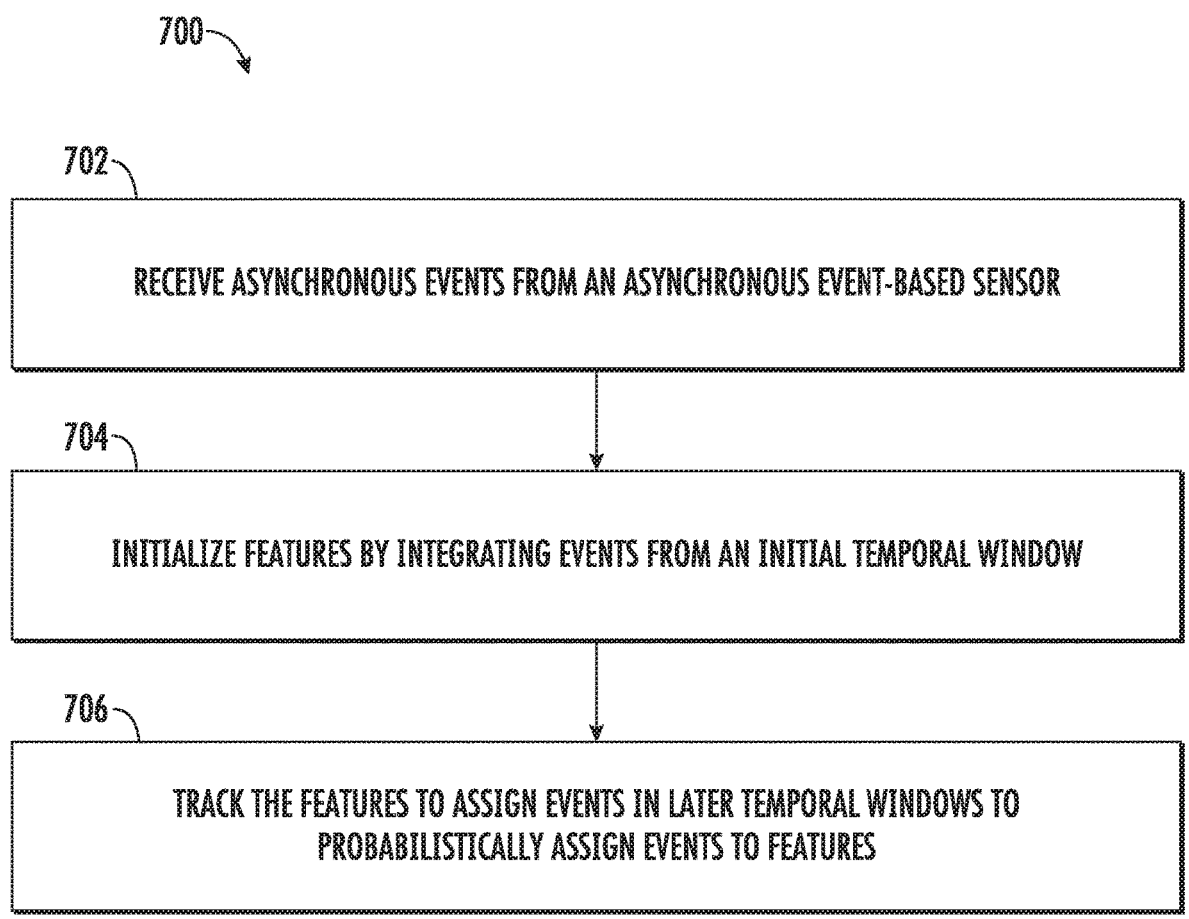
FIG. 7 is a flow diagram of an example method for feature tracking in asynchronous event-based sensors that relies on probabilistic data association.

FIG. 7 is a flow diagram of an example method 700 for feature tracking in asynchronous event-based sensors that relies on probabilistic data association. The method 700 can be performed, for example, by a computer system programmed to perform aspects of the algorithm described above with reference to FIGS. 1-6. The method 700 includes receiving asynchronous events from asynchronous event-based sensor (702). The method 700 includes initializing one or more features by integrating events from an initial temporal window into an initial image and detecting the features in the initial image (704). The method 700 includes tracking the features after the initial temporal window, including assigning events corresponding to later temporal windows to features by determining, for each event and each feature, a probability that the event is associated with the feature (706). The method 700 can end when the tracking indicates that the feature is lost. Based on the tracking, motion of one or more physical objects can be identified.

The following sections present an algorithm to fuse a purely event-based tracking algorithm with an inertial measurement unit, to provide accurate metric tracking of a camera's full 6dof pose. The algorithm is asynchronous, and provides measurement updates at a rate proportional to the camera velocity. The algorithm selects features in the image plane, and tracks spatiotemporal windows around these features within the event stream. An Extended Kalman Filter with a structureless measurement model then fuses the feature tracks with the output of the IMU. The camera poses from the filter are then used to initialize the next step of the tracker and reject failed tracks.

Problem Formulation

Consider a sensor package consisting of an inertial measurement unit (IMU) and an event-based camera. Without loss of generality, assume that the camera and IMU frames are coincident. The state of the sensor package:

$$s := [\bar{q} b_g v b_a p] \quad (1)$$

consists of its position $p \in \mathbb{R}^3$, its velocity $v \in \mathbb{R}^3$, the orientation of the global frame in the sensor frame represented by a unit quaternion $q \in SO(3)$, and the accelerometer and gyroscope measurement biases, ba and bg, respectively.

At discrete times $T_1, T_2, \ldots$ the IMU provides acceleration and angular velocity measurements $I := \{(a_k, \omega_k, T_k)\}$. The environment, in which the sensor operates, is modeled as a collection of landmarks $L := \{L_j \in \mathbb{R}^3\}_{j=1}^m$.

At discrete times $t_1, t_2, \ldots,$ the event-based camera generates events $E := \{(x_i, t_i)\}$ which measure the perspective projection of the landmark positions as follows:

$$\pi([X \ Y \ Z]^T) := \frac{1}{Z} \begin{bmatrix} X \\ Y \end{bmatrix} \quad (2)$$

$$h(L, s) := \pi(R(\bar{q})(L - p))$$

$$x_i = h(L_{\alpha(i)}, s(t_i)) + \eta(t_i), \quad \eta(t_i) \sim \mathcal{N}(0, \Sigma)$$

Where $a: \mathcal{N} \to \{1, \ldots, m\}$ is an unknown function representing the data association between the events E and the landmarks L and R(q) is the rotation matrix corresponding to the rotation generated by quaternion q.

Problem 1 (Event-based Visual Inertial Odometry). Given inertial measurements I and event measurements E, estimate the sensor state s(t) over time.

Overview

The visual tracker uses the sensor state and event information to track the projections of sets of landmarks, collectively called features, within the image plane over time, while the filtering algorithm fuses these visual feature tracks with the IMU data to update the sensor state. In order to fully utilize the asynchronous nature of event-based cameras, the temporal window at each step adaptively changes according to the optical flow. The full outline of our algorithm can be found in FIG. 8 and Alg. 2.

---
Algorithm 2 EVIO
---
Input: sensor state $s_i$, events $\varepsilon$, IMU readings $\mathcal{I}$, window size $dt_i$
Track features { f } in the event stream, $\varepsilon$, given $s_i$
Select new features in the image plane
Calculate the size of the next temporal window $dt_{i+1}$
Update the state estimate $s_{i+1}$ given { f } and $\mathcal{I}$.
---

Figure 8:
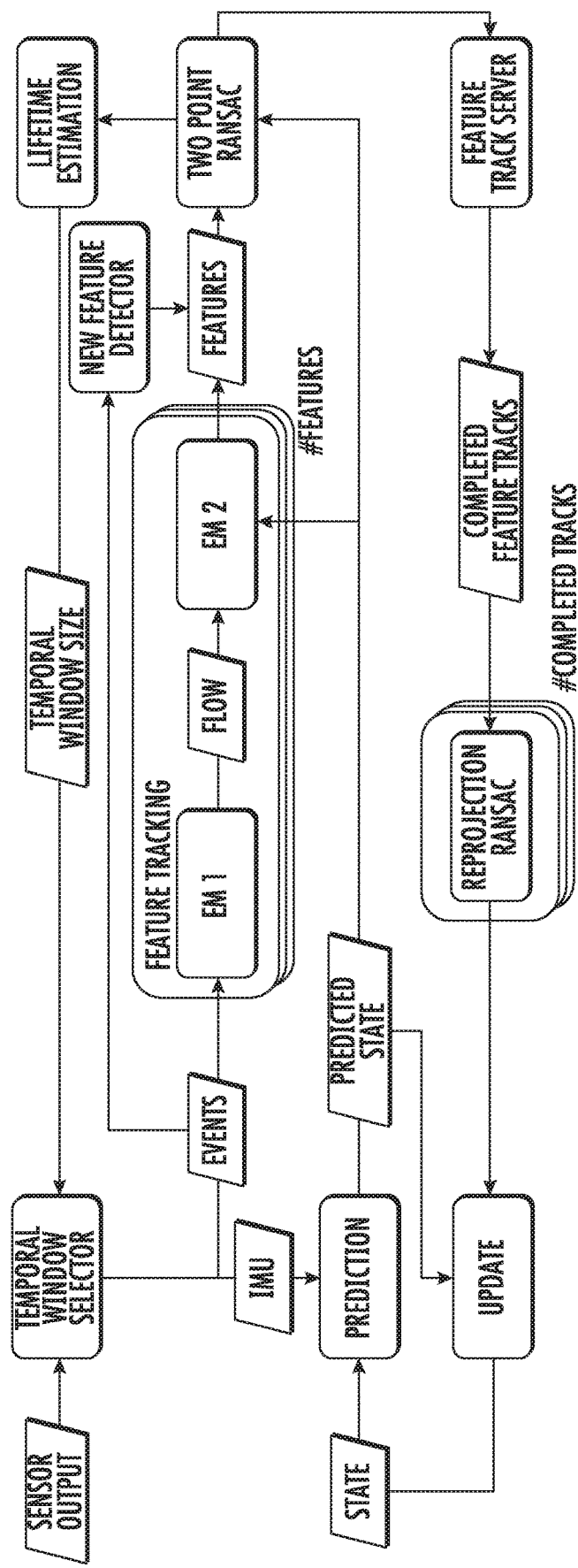
FIG. 8 shows an overview of the EVIO algorithm.

FIG. 8 shows an overview of the EVIO algorithm. Data from the event-based camera and IMU is processed in temporal windows determined by our algorithm. For each temporal window, the IMU values are used to propagate the state, and features are tracked using two expectation maximization steps that estimate the optical flow of the features and their alignment with respect to a template. Outlier correspondences are removed, and the results are stored in a feature track server. As features are lost, their feature tracks are parsed through a second random sample consensus (RANSAC) step, and the resulting tracks are used to update the sensor state. The estimated optical flows for all of the features are then used to determine the size of the next temporal window.

The algorithm leverages the property that all events generated by the same landmark lie on a curve in the spatiotemporal domain and, given the parameters of the curve, can be propagated along the curve in time to a single point in space (barring error from noise). In addition, the gradient along this curve at any point in time represents the optical flow of the landmark projection, at that time. Therefore, we can reduce the tracking problem to one of finding the data association between events and landmark projections, and estimating the gradient along events generated by the same point.

To simplify the problem, we make the assumption that optical flow within small spatiotemporal windows is constant. That is, the curves within these windows become lines, and estimating the flow is equivalent to estimating the slope of these lines. To impose this constraint, we dynamically update the size of the temporal window, dt, based on the time for each projected landmark position to travel k pixels in the image, estimated using the computed optical flow. This way, we are assuming constant optical flow for small displacements, which has been shown to hold in practice. Given these temporal windows, we compute feature position information within a discrete set of nonoverlapping time windows $\{[T_1, T_2], [T_2, T_3], \ldots\}$ where $T_{i+1} - T_i = dt_i$.

Problem 1a (Event-based Feature Tracking). Given event measurements E, the camera state $s_i := s(T_i)$ at time $T_i$ and a temporal window size $dt_i$, estimate the feature projections F(t) for $t \in [T_i, T_i+1]$ in the image plane and the next temporal window size $dt_{i+1}$.

Given the solution to Problem 1a and a set of readings from the IMU, our state estimation algorithm then employs an Extended Kalman Filter with a structureless vision model. Structured extended Kalman filter (EKF) schemes impose vision constraints on all the features between each two subsequent camera poses, and as a result optimize over both the camera poses and the feature positions. A structureless model, on the other hand, allows us to impose constraints between all camera poses that observe each feature, resulting in a state vector containing only the IMU and camera poses. This drastically reduces the size of the state vector, and allows for marginalization over long feature tracks. We pose the state estimation problem as the sub problem below:

Problem 1b (Visual Inertial Odometry). Given inertial measurements I at times $\{t_k\}$, a camera state $s_i$ at time $T_i$, a temporal window size $dt_i$, and feature tracks F(t) for $t \in [T_i, T_{i+1}]$, estimate the camera state $s_{i+1}$.

Event-Based Feature Tracking

Given a camera state $s_i$ and a temporal window $[T_i, T_{i+1}]$, the goal of Problem 1a is to track a collection of features F(t) in the image domain for $t \in [T_i, T_{i+1}]$, whose positions are initialized using traditional image techniques. Our approach performs two expectation-maximization (EM) optimizations to align a 3-D spatiotemporal window of events with a prior 2-D template in the image plane.

Optical Flow Estimation

The motion of a feature f(t) in the image plane can be described using its optical flow t(t) as follows:

$$f(t) = f(T_i) + \int_{T_i}^t \dot{f}(\varsigma) d\varsigma = f(T_i) + (t - T_i) u(t)$$

where $$u(t) := \frac{1}{t - T_i} \int_{T_i}^t \dot{f}(\zeta) d\zeta$$

is the average flow of f(s) for $s \in [T_i, t]$. If $[T_i, T_{i+1}]$ is sufficiently small, we can assume that the average flow u is constant and equal to the average flows of all landmarks $L_j$ whose projections are close to f in the image plane. To formalize this observation, we define a spatiotemporal window around $f(T_i)$ as the collection of events, that propagate backwards to and landmarks whose projections at time $T_i$ are close to the vicinity of $f(T_i)$:

$$w_i := \{(x,t) \in \varepsilon, L \in \mathcal{L} \mid \|(x - \bar{t}u) - f(T_i)\| \le \xi,$$

$$\|l - f(T_i)\| \le \xi, t \in [T_i, T_{i+1}]\} \quad (3)$$

where $\xi$ is the window size in pixels, $\bar{t} := t - T_i$, l:=h(L,s), as defined above.

Provided that $[T_i, T_{i+1}]$ is small, the following equality should hold for any event $e_k$ and landmark $L_j$ in $W_i$:

$$\|(x_k - \bar{t}_k u) - l_j\|^2 \mathbf{1}_{\{a(k) = j\}} = 0 \quad (4)$$

where the indicator requires that event k associates with landmark j. However, since the data association between events and landmarks in unknown, we can hope to satisfy the above requirement only in expectation:

$$\mathbb{E}_{a(k)} \|(x_k - \bar{t}_k u) - l_j\|^2 \mathbf{1}_{\{a(k)=j\}} = r_{kj} \|(x_k - \bar{t}_k u) - l_j\|^2 = 0 \quad (5)$$

where $r_{kj} := \mathcal{P}(a(k) = j)$. Given the flow u of feature $f(T_i)$, due to the measurement model in (2), we model the probability that event $e_k$ was generated from landmark $L_j$ as proportional to the probability density function $\varnothing((x_k - \bar{t}_k u); l_j, \Sigma)$ of a Gaussian distribution with mean $l_j$ and covariance $\Sigma$.

Let $[n_i] := \{1, \ldots, n_i\}$ be an enumeration of the events in W. The optical flow constraints in (5) and the data association probabilities $r_{kj}$ allow us to estimate the optical flow $\underline{u}$ of feature $f(T_i)$ as follows:

$$\min_u \sum_{k=1}^{n_i} \sum_{j=1}^{m} r_{kj} \|(x_k - \bar{t}_k u) - l_j\|^2 \quad (6)$$

Unfortunately, the landmark projections $\{l_j\}_{j=1}^m$ needed to compute the data association probabilities are unknown. Instead, we approximate $\{l_j\}_{j=1}^m$ in the above optimization with the set $$\bar{l}_j^{i-1} := \{(x+(T_i-t)u_{i-1})|(x,t)\in W_{i-1}\} \quad (7)$$

of forward-propagated events from the previous iteration to the current time. This set provides a close approximation to $\{l_j\}_{j=1}^m$ because, as $u_{i-1}$ approaches the true optical flow, (4) requires that every point in $\{\bar{l}_j^{i-1}\}_{j=1}^{n_{i-1}}$ approaches some point in $l_j$ at time $T_i$, due to continuity in the projected feature trajectories. This leads to the following result for estimating the optical flow of feature $f(T_i)$.

Proposition 1

Given a sufficiently small temporal window $[T_i, T_{i+1}]$ so that the average optical flow u of a feature $f(t), t\in[T_i, T_{i+1}]$ is approximately constant and a spatiotemporal window $W_i$ of $n_i$ events associated with f, the optical flow u can be estimated by iterating the following EM steps:

$$E) \; r_{kj} = \frac{\phi((x_k - t_k u); \bar{l}_j^{i-1}, \Sigma)}{\sum_{j'} \phi((x_k - t_k u); \bar{l}_{j'}^{i-1}, \Sigma)}, \quad \begin{array}{l} k \in [n_i] \\ j \in [n_{i-1}] \end{array} \quad (8)$$

$$M) \; u = \frac{\sum_{k=1}^{n_i-1}\sum_{j=1}^{n_i-1} r_{kj}(x_k - \bar{l}_j^{i-1})t_k}{\sum_{k=1}^{n_i-1}\sum_{j=1}^{n_i-1} r_{kj}t_k^2} \quad (9)$$

Proof. Given an optical flow estimate, the E step computes the likelihood $r_{kj}$ of the data association between events $e_k$ and approximate landmark projections $\bar{l}_j^{i-1}$ by propagating the events backwards in time and applying the measurement model in (2). Given $r_{kj}$, the M step is a weighted linear least squares problem in u, which corresponds to the overdetermined system $ud^T = Y$, where:

$$d := [\sqrt{r_{12}}t^1, \ldots, \sqrt{r_{kj}}t_k, \ldots]^T$$

$$Y := [\sqrt{r_{12}}(X_1 - \bar{l}_2^{i-1}), \ldots, \sqrt{r_{kj}}(X_k - \bar{l}_j^{i-1}), \ldots]$$

To get the normal equations, we multiply both sides on the right by d and obtain $u = (Y\,d)/(d^T\,d)$.

During the initialization of each feature, no prior flow is known, and so we further substitute the prior events in $\{\bar{l}_j\}$ with the current events and flow, $\{(x-\bar{t}u),(x,t)\in w_i\}$. Once again, this approximation approaches the true projected landmark positions as u approaches the true flow. The M step, in this case, becomes:

$$u = \frac{\sum_{k=1}^{n_i}\sum_{j=1}^{n_1} r_{kj}(x_k - x_j)(\bar{t}_k - \bar{t}_j)}{\sum_{k=1}^{n_i}\sum_{j=1}^{n_1} r_{kj}(\bar{t}_k - \bar{t}_j)^2}$$

where $r_{kj}$ is computed as in (8). This method is significantly slower, as the distance computation in the E step uses two different sets of points every iteration. This is detrimental for most neighbor search data structures such as k-d trees, as the data structure must be reconstructed at every iteration. However, as this step is only performed once per feature, it is effectively marginalized out for long feature tracks.

Template Alignment and RANSAC

While Prop. 1 is sufficient to solve Problem 1a, the feature position estimates may drift as a feature is being tracked over time, due to noise in each flow estimate. To correct this drift, we estimate it as the affine warping that warps $\{\tilde{l}_k^i\}_{k=1}^{n_i}$ (7) to the template $\{\tilde{l}_j^{i*}\}_{j=1}^{n_{i*}}$ in the first camera pose that observed the feature. We assume that the corresponding landmarks $\{l\}$ are planar in 3-D, so that we can alternatively represent the affine wrapping as a 3-D rotation and scaling. The 3-D rotation $^{i*}R_i$ from the current camera pose at $T_i$ to the first camera pose at $T_i^*$ can be obtained from the filter used to solve Problem 1b. Hence, in this section we focus on estimating only a scaling a and translation b between $\{\tilde{l}_k^i\}$ and $\{\tilde{l}_j^{i*}\}$. First, we rotate each point to the first camera frame and center at the rotated feature position as follows:

$$y_k^i = \pi\left(^{i*}R_i\begin{pmatrix}\bar{l}_k^i\\1\end{pmatrix}\right) - \pi\left(^{i*}R_i\begin{pmatrix}f(T_i)+u_i dt_i\\1\end{pmatrix}\right)$$

Where $\pi$ is the projection function defined in (2). Note that $\tilde{l}_k^i$ propagates events to time $T_{i+1}$, and so we substitute $f(T_i)+u_i dt_i$ as an estimate for $f(T_{i+1})$. Then, using the same idea as above, we seek the scaling $\sigma$ and translation b that minimize the mismatch between $\{y_k^i\}_{k=1}^{n_i}$ and $\{l_j^{i*}\}_{j=1}^{n_{i*}}$:

$$\min_{\sigma,b} \sum_{k=1}^{n_i}\sum_{j=1}^{n_{i*}} r_{kj}\|\sigma y_k^i - b - \bar{l}_j^{i*}\|^2 \quad (10)$$

This optimization problem has a similar form to problem (6) and, as before, can be solved via the following EM steps:

$$E) \; r_{kj} = \frac{\phi(y_k; \bar{l}_j^{i*}, \Sigma)}{\sum_{j'} \phi(y_k; \bar{l}_{j'}^{i*}, \Sigma)}, \quad k \in [n_i], j \in [n_{i*}] \quad (11)$$

$$M) \begin{cases} \bar{y} := \frac{1}{n_i}\sum_{k=1}^{n_i} y_k \quad \bar{l} := \frac{1}{n_{i*}}\sum_{j=1}^{n_{i*}} \bar{l}_j \\ \sigma = \sqrt{\frac{\sum_{k=1}^{n_i}\sum_{j=1}^{n_{i*}} r_{kj}(y_k - \bar{y})^T(\bar{l}_j - \bar{l})}{\sum_{k=1}^{n_i}\sum_{j=1}^{n_{i*}} r_{kj}(y_k - \bar{y})^T(y_k - \bar{y})}} \\ b = \frac{\sigma}{n_i}\sum_{k=1}^{n_i}\sum_{j=1}^{n_{i*}} r_{kj}y_k - \frac{1}{n_{i*}}\sum_{k=1}^{n_i}\sum_{j=1}^{n_{i*}} r_{kj}\bar{l}_j = \\ \frac{\sigma}{n_i}\sum_{k=1}^{n_i} y_k - \frac{1}{n_{i*}}\sum_{k=1}^{n_i}\sum_{j=1}^{n_{i*}} r_{kj}\bar{l}_j \\ \text{as } \sum_{j=1}^{n_{i*}} r_{kj} = 1 \end{cases}$$

where the M step is solved as in scaled ICP.

---

Algorithm 3 Event-based Feature Tracking

Input
    sensor state $s_i$, current time $T_i$, window size $dt_i$,
    events $\varepsilon$ for $t \in [T_i, T_i + dt_i]$,
    features $\{f\}$ and associated templates $\{\bar{l}^{i-1}\}, \{\bar{l}^{i*}\}$ -continued Algorithm 3 Event-based Feature Tracking

```
Tracking
   for each feature f do
      Find events within W_i (3)
      cost ← ∞
      while cost > ε_1 do
         Update r_tj (8), u (9) and cost (6)
         Back-propagate events to T_i using u
      cost ← ∞
      while cost > ε_2 do
         Update r_tj (11), (σ, b) (11) and cost (10)
         f ← f - b + dt_i u
   dt_{i+1} ← 3/median({||u||})
   return { f } and dt_{i+1}
```

Outlier Rejection

In order to remove outliers from the above optimizations, only pairs of points $((x_k - \bar{t}_k u)$ and $(\sigma y_k - b))$, and approximate projected landmarks, $\hat{l}_j$, with Mahalanobis distance below a set threshold are used in the optimizations. This also serves the purpose of heavily reducing the number of computation.

After all of the features have been updated, two-point RANSAC is performed given the feature correspondences and the rotation between the frames from the state to remove features whose tracking have failed. Given two correspondences and the rotation, we estimate the essential matrix, and evaluate the Sampson error on the set of correspondences to determine the inlier set. The complete feature tracking procedure is illustrated in FIG. 2 and summarized in Alg. 3.

The Mahalanobis distance between a point x and a distribution with mean μ and standard distribution Σ is defined as: $d := \sqrt{(x-\mu)^T \Sigma (x-\mu)}$.

Given a correspondence between two points $x_1$, $x_2$ and the camera translation t and rotation R between the points, the Essential matrix is defined as: $E = t \times R$, and the sampson error is defined as:

$$e = \frac{x_2^T E x_1}{(Ex_1)_1^2 + (Ex_1)_2^2 + (Ex_2)_1^2 + (Ex_2)_2^2}$$

Temporal Window Size Selection

To set the temporal window size such that each feature moves k pixels within the window, we leverage the concept of 'event lifetimes'. Given an estimate of the optical flow, u, of a feature f at a given time, $T_i$, the expected time for the feature to move 1 pixel in the image is $$\frac{1}{\|u\|_2}.$$

Therefore, to estimate the time for a feature to move k pixels, the time is simply $$dt(f) = \frac{k}{\|u\|_2}$$

Given a set of tracked features, we set the next temporal window size as: $dt_{i+1} = \text{median}(\{dt(f) | f \in \mathcal{F}\})$. Assuming that the differences in depth between the features is not large, this window size should ensure that each feature will travel roughly k pixels in the next temporal window. For all of our experiments, k is set to 3.

Feature Detection

Like traditional image based tracking techniques, our event-based feature tracker suffers from the aperture problem. Given a feature window with only a straight line, we can only estimate the component of the optical flow that is normal to the slope of this line. As a result, features must be carefully selected to avoid selecting windows with a single strong edge direction. To do so, we find 'corners' in the image that have strong edges in multiple directions. In order to produce an image from the event stream, we simply take the orthogonal projection of the events onto the image plane. As we constrain each temporal window such that features only travel k pixels, this projection should reconstruct the edge map of the underlying image, with up to k pixels of motion blur, which should not be enough to corrupt the corner detection. The actual corner detection is performed with FAST corners, with the image split into cells of fixed size, and the corner with the highest Shi-Tomasi score within each cell being selected.

State Estimation

To estimate the 3D pose of the camera over time, we employ an Extended Kalman Filter with a structureless vision model. For compactness, we do not expand on the fine details of the filter. At time $T_i$, the filter tracks the current sensor state (1) as well as all past camera poses that observed a feature that is currently being tracked. The full state, then, is:

$$S_i := S(T_i) = [_i^T \bar{q}(T_{i-n})^T p(T_{i-n})^T \ldots \bar{q}(T_i)^T p(T_i)^T]^T$$

where n is the length of the oldest tracked feature.

Between update steps, the prediction for the sensor state is propagated using the IMU measurements that fall in between the update steps. Note that, due to the high temporal resolution of the event based camera, there may be multiple update steps in between each IMU measurement. In that case, we use the last IMU measurement to perform the propagation.

Given linear acceleration $a_k$ and angular velocity $\omega_k$ measurements, the sensor state is propagated using 5th order Runge-Kutta integration:

$$\dot{\bar{q}}(T_k) = \frac{1}{2}\Omega(w_k - \hat{b}_g(T_k))\bar{q}(T_k) \quad (12)$$

$$\dot{p}(T_k) = v(T_k) \qquad \dot{b}_a(T_k) = 0$$

$$\dot{v}(T_k) = R(\bar{q}(T_k))^T(a_k - \hat{b}_a(T_k)) + g \quad \dot{b}_g(T_k) = 0$$

To perform the covariance propagation, we adopt a discrete time model and covariance prediction update. When an update from the tracker arrives, we augment the state with a new camera pose at the current time, and update the covariance using the Jacobian that maps the IMU state to the camera state.

We then process any discarded features that need to be marginalized. For any such feature $f_j$, the 3D position of the feature $\hat{F}_j$ can be estimated using its past observations and camera poses by Gauss Newton optimization, assuming the camera poses are known. The projection of this estimate into a given camera pose can then be computed using (2). The residual, $r^{(j)}$, for each feature at each camera pose is the difference between the observed and estimated feature positions. We then left multiply $r^{(j)}$ by the left null space, A, of the feature Jacobian, $H_F$, to eliminate the feature position up to a first order approximation:

$$r_0^{(j)} = A^T r^{(j)} \tag{13}$$
$$\approx A^T H_S^{(j)} \tilde{S} + A^T H_F^{(j)} \tilde{F}_j + A^T n^{(j)} := H_0^{(j)} \tilde{S} + n_0^{(j)}$$

$$r_n = Q_1^T r_0 \tag{14}$$

$$H_0 = [Q_1 \; Q_2] \begin{bmatrix} T_H \\ 0 \end{bmatrix}$$

The elimination procedure is performed for all features, and the remaining uncorrelated residuals, $r_0^{(j)}$ are stacked to obtain the final residual $r_0$. We perform one final step to reduce the dimensionality of the above residual. Taking the QR decomposition of the matrix $H_0$, we can eliminate a large part of the residual. The EKF update step is then $\Delta s = K r_n$, where K is the Kalman gain.

When a feature track is to be marginalized, we apply a second RANSAC step to find the largest set of inliers that project to the same point in space, based on reprojection error. This removes moving objects and other erroneous measurements from the track.

---
Algorithm 4 State Estimation
---
Input
    sensor state $s_i$, features { f }
    IMU values $\mathcal{I}$ for t ∈ [$T_i$, $T_i$ + $dt_i$]
Filter
    Propagate the sensor state mean and covariance (12)
    Augment a new camera state
    for each filter track to be marginalized do
        Remove inconsistent observations
        Triangulate the feature using GN Optimization
        Compute the uncorrelated residuals $r_0^{(j)}$ (13)
    Stack all of the $r_0^{(j)}$
    Perform QR decomposition to get the final residual (14)
    Update the state and state covariance
---

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

REFERENCES

The following documents are hereby incorporated by reference:

[1] P. Lichtsteiner, C. Posch, and T. Delbruck, "A 128_128 120 db 15 μs latency asynchronous temporal contrast vision sensor," IEEE journal of solid-state circuits, vol. 43, no. 2, pp. 566-576, 2008.

[2] C. Brandli, R. Berner, M. Yang, S.-C. Liu, and T. Delbruck, "A 240×180 130 db 3 μs latency global shutter spatiotemporal vision sensor," IEEE Journal of Solid-State Circuits, vol. 49, no. 10, pp. 2333-2341, 2014.

[3] B. K. Horn and B. G. Schunck, "Determining optical flow," Artificial intelligence, vol. 17, no. 1-3, pp. 185-203, 1981.

[4] J. Shi and C. Tomasi, "Good features to track," in Computer Vision and Pattern Recognition, 1994. Proceedings CVPR'94., 1994 IEEE Computer Society Conference on, pp. 593-600, IEEE, 1994.

[5] M. Litzenberger, C. Posch, D. Bauer, A. Belbachir, P. Schon, B. Kohn, and H. Garn, "Embedded vision system for real-time object tracking using an asynchronous transient vision sensor," in 2006 IEEE 12th Digital Signal Processing Workshop & 4th IEEE Signal Processing Education Workshop, pp. 173-178, IEEE, 2006.

[6] D. Comaniciu, V. Ramesh, and P. Meer, "Real-time tracking of nonrigid objects using mean shift," in Computer Vision and Pattern Recognition, 2000. Proceedings. IEEE Conference on, vol. 2, pp. 142-149, IEEE, 2000.

[7] H. Kim, A. Handa, R. Benosman, S. H. Ieng, and A. J. Davison, "Simultaneous mosaicing and tracking with an event camera," J. Solid State Circ, vol. 43, pp. 566-576, 2008.

[8] Z. Ni, S. H. Ieng, C. Posch, S. R'egnier, and R. Benosman, "Visual tracking using neuromorphic asynchronous event-based cameras," Neural computation, 2015.

[9] X. Lagorce, C. Meyer, S. H. Ieng, D. Filliat, and R. Benosman, "Asynchronous event-based multikernel algorithm for high-speed visual features tracking," IEEE transactions on neural networks and learning systems, vol. 26, no. 8, pp. 1710-1720, 2015.

[10] S. Tschechne, T. Brosch, R. Sailer, N. von Egloffstein, L. I. Abdul-Kreem, and H. Neumann, "On event-based motion detection and integration," in Proceedings of the 8th International Conference on Bioinspired Information and Communications Technologies, BICT '14, 2014.

[11] D. Tedaldi, G. Gallego, E. Mueggler, and D. Scaramuzza, "Feature detection and tracking with the dynamic and active-pixel vision sensor (davis)," in Int. Conf. on Event-Based Control, Comm. and Signal Proc. (EBCCSP), Krakow, Poland, 2016.

[12] B. Kueng, E. Mueggler, G. Gallego, and D. Scaramuzza, "Low-latency visual odometry using event-based feature tracks," in IEEE/RSJ International Conference on Robotics and Intelligent Systems, IEEE/RSJ, 2016.

[13] F. Barranco, C. Fermuller, Y. Aloimonos, and T. Delbruck, "A dataset for visual navigation with neuromorphic methods," Frontiers in neuroscience, vol. 10, 2016.

[14] S. Granger and X. Pennec, "Multi-scale em-icp: A fast and robust approach for surface registration," in European Conference on Computer Vision, pp. 418-432, Springer, 2002.

[15] E. Mueggler, C. Forster, N. Baumli, G. Gallego, and D. Scaramuzza, "Lifetime estimation of events from dynamic vision sensors," in 2015 IEEE International Conference on Robotics and Automation (ICRA), pp. 4874-4881, IEEE, 2015.

[16] C. Harris and M. Stephens, "A combined corner and edge detector," Citeseer, 1988.

[17] B. Lucas and T. Kanade, "An iterative image registration technique with an application to stereo vision," in Int. Joint Conf. on Artificial Intelligence (IJCAI), vol. 81, pp. 674-679, 1981.

What is claimed is:

1. A method for tracking features in image data, the method comprising:
    detecting, over a period of time, a plurality of asynchronous events from an asynchronous event-based sensor;
    initializing one or more features in the image data by integrating events from an initial temporal window into an initial image and detecting the one or more features in the initial image;
    tracking the one or more features after the initial temporal window, including assigning events, corresponding to temporal windows after the initial temporal window, to the one or more features by determining, for each event and each point within the feature, a probability that the event is associated with the point; and
    identifying, based on the tracking, motion of one or more physical objects.

2. The method of claim 1, wherein tracking the one or more features comprises estimating an optical flow for each feature describing motion of the feature in an image plane over a spatiotemporal window.

3. The method of claim 2, wherein estimating an optical flow comprises solving a constraint based on grouping events generated from the same point over the spatiotemporal window and a corresponding set of events using an Expectation Maximization algorithm.

4. The method of claim 1, wherein initializing the one or more features comprises, for each feature, determining an optical flow for the feature, reconstructing a set of point projections for the feature using the optical flow, and refining a position of the feature using an Expectation Maximization Iterative Closest Point (EM-ICP) algorithm.

5. The method of claim 4, wherein initializing the one or more features comprises integrating the events from the initial temporal window with zero flow and selecting, using a corner detector, a plurality of spatial windows containing at least a threshold number of variations in event density for tracking the features.

6. The method of claim 1, wherein tracking the features comprises asynchronously selecting a size for each temporal window after the initial temporal window.

7. The method of claim 1, wherein receiving the asynchronous events comprises receiving, over the period of time, pixel data from a camera configured to respond only to changes detected in a view of the camera.

8. The method of claim 1, wherein tracking the one or more features comprises executing an extended Kalman filter with a structureless measurement model to include inertial measurement data from an inertial measurement unit of the asynchronous event-based sensor.

9. A system for tracking features, the system comprising:
    at least one processor; and
    an event-based feature tracker implemented on the at least one processor and configured for:
        detecting, over a period of time, a plurality of asynchronous events from an asynchronous event-based sensor;
        initializing one or more features in the image data by integrating events from an initial temporal window into an initial image and detecting the one or more features in the initial image;
        tracking the one or more features after the initial temporal window, including assigning events, corresponding to temporal windows after the initial temporal window, to the one or more points within the features by determining, for each event and each point, a probability that the event is associated with the point; and
        identifying, based on the tracking, motion of one or more physical objects.

10. The system of claim 9, wherein tracking the one or more features comprises estimating an optical flow for each feature describing a motion of the feature in an image plane over a spatiotemporal window.

11. The system of claim 10, wherein estimating an optical flow comprises solving a constraint based on grouping events generated from the same point over the spatiotemporal window and a corresponding set of events using an Expectation Maximization algorithm.

12. The system of claim 9, wherein initializing the one or more features comprises, for each feature, determining an optical flow for the feature, reconstructing a set of point projections for the feature using the optical flow, and refining a position of the feature using an Expectation Maximization Iterative Closest Point (EM-ICP) algorithm.

13. The system of claim 12, wherein initializing the one or more features comprises integrating the events from the initial temporal window with zero flow and selecting, using a corner detector, a plurality of spatial windows containing at least a threshold number of variations in event density for tracking the features.

14. The system of claim 9, wherein tracking the one or more features comprises asynchronously selecting a size for each later temporal window.

15. The system of claim 9, wherein receiving the asynchronous events comprises receiving, over the period of time, pixel data from a camera configured to respond only to changes detected in a view of the camera.

16. The system of claim 9, wherein tracking the one or more features comprises executing an extended Kalman filter with a structureless measurement model to include inertial measurement data from an inertial measurement unit of the asynchronous event-based sensor.

17. A non-transitory computer readable medium storing executable instructions that when executed by at least one processor of a computer control the computer to perform operations comprising:
    detecting, over a period of time, a plurality of asynchronous events from an asynchronous event-based sensor;
    initializing one or more features in the image data by integrating events from an initial temporal window into an initial image and detecting the one or more features in the initial image;
    tracking the one or more features after the initial temporal window, including assigning events, corresponding to temporal windows after the initial temporal window, to the one or more points within the features by determining, for each event and each point, a probability that the event is associated with the point; and
    identifying, based on the tracking, motion of one or more physical objects.

18. The non-transitory computer readable medium of claim 17, wherein tracking the one or more features comprises estimating an optical flow for each feature describing a motion of the feature in an image plane over a spatiotemporal window.

19. The non-transitory computer readable medium of claim 18, wherein estimating an optical flow comprises solving a sparsity constraint over the spatiotemporal window and a corresponding set of events using an Expectation Maximization algorithm.

20. The non-transitory computer readable medium of claim 17, wherein initializing the one or more features comprises, for each feature, determining an optical flow for the feature, reconstructing a set of point projections for the feature using the optical flow, and refining a position of the feature using an Expectation Maximization Iterative Closest Point (EM-ICP) algorithm.

* * * * *

UNITED STATES PATENT AND TRADEMARK OFFICE
CERTIFICATE OF CORRECTION

| | |
|---|---|
| PATENT NO. | : 11,138,742 B2 |
| APPLICATION NO. | : 16/486066 |
| DATED | : October 5, 2021 |
| INVENTOR(S) | : Daniilidis et al. |

It is certified that error appears in the above-identified patent and that said Letters Patent is hereby corrected as shown below:

In the Specification

Column 1, Line 2:
Please add:
--GOVERNMENT INTEREST
This invention was made with government support under HR0011-15-2-0020 awarded by the Defense Advanced Research Projects Agency. The government has certain rights in the invention.--

Signed and Sealed this
Twenty-third Day of April, 2024

Katherine Kelly Vidal
*Director of the United States Patent and Trademark Office*